US012014399B2

(12) United States Patent
Taifi

(10) Patent No.: US 12,014,399 B2
(45) Date of Patent: Jun. 18, 2024

(54) CROSS-MEDIA TARGETABLE CONTENT RECOMMENDER SYSTEM FOR AUDIENCE EXTENSION IN CONTENT DELIVERY SYSTEMS

(71) Applicant: Microsoft Technology Licensing, LLC, Redmond, WA (US)

(72) Inventor: Moussa Taifi, Jackson Heights, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/149,947

(22) Filed: Jan. 15, 2021

(65) Prior Publication Data
US 2022/0230205 A1    Jul. 21, 2022

(51) Int. Cl.
G06Q 30/0241    (2023.01)
G06N 20/00    (2019.01)
G06Q 30/0201    (2023.01)
G06Q 30/0242    (2023.01)

(52) U.S. Cl.
CPC ......... *G06Q 30/0276* (2013.01); *G06N 20/00* (2019.01); *G06Q 30/0201* (2013.01); *G06Q 30/0246* (2013.01)

(58) Field of Classification Search
CPC .......... G06Q 30/0276; G06Q 30/0201; G06Q 30/0246; G06N 20/00
See application file for complete search history.

(56) References Cited

U.S. PATENT DOCUMENTS

| 7,231,358 | B2 | 6/2007 | Singh et al. | |
| 7,835,943 | B2 | 11/2010 | Cheung et al. | |
| 8,527,343 | B1* | 9/2013 | Hubinette | G06Q 30/02 |
| | | | | 705/14.42 |

(Continued)

FOREIGN PATENT DOCUMENTS

WO    WO-2017190749 A1 *    11/2017

OTHER PUBLICATIONS

K. G. Saranya et al., Performance Comparison of Different Similarity Measures for Collaborative Filtering Technique, Indian Journal of Science and Technology, vol. 9(29), DOI: 10.17485/ijst/2016/v9i29/91060, Aug. 2016 (Year: 2016).*

(Continued)

*Primary Examiner* — Mario C. Iosif
(74) *Attorney, Agent, or Firm* — Calfee, Halter & Griswold LLP

(57) ABSTRACT

Aspects of the subject disclosure may include, for example, collecting television viewership information for viewers of television content items of a television advertising campaign, collecting digital viewership information for online activity by users, joining the television viewership information and the digital viewership information, wherein the joining comprises associating household identifiers of the television viewership information with device identifiers of the digital viewership information, building a content ranking of digital content items closest to the television content items and initiating, by the processing system, a digital advertising campaign with one or more digital content items of the content ranking of digital content items attached to the digital advertising campaign. Other embodiments are disclosed.

15 Claims, 9 Drawing Sheets

(56) References Cited

U.S. PATENT DOCUMENTS

| | | | | |
|---|---|---|---|---|
| 8,973,023 | B1* | 3/2015 | Rao | G06Q 30/0242 705/14.44 |
| 2012/0011538 | A1* | 1/2012 | Yarvis | H04N 21/4667 725/31 |
| 2012/0096491 | A1* | 4/2012 | Shkedi | H04N 21/6175 725/35 |
| 2015/0121408 | A1* | 4/2015 | Jacoby | H04N 21/251 725/18 |
| 2016/0119689 | A1* | 4/2016 | Hood | H04N 21/25891 725/14 |
| 2016/0188725 | A1* | 6/2016 | Wang | G06F 16/9535 707/734 |
| 2017/0034591 | A1* | 2/2017 | Ray | H04N 21/2668 |
| 2017/0330239 | A1 | 11/2017 | Luo et al. | |
| 2018/0084308 | A1* | 3/2018 | Lopatecki | H04H 60/82 |

OTHER PUBLICATIONS

Barkan, Oren et al., "ITEM2VEC: Neural Item Embedding for Collaborative Filtering", Tel Aviv University; Microsoft, Feb. 20, 2017, 6 pages.

Github, , "Github—Maciejkula/Spotlight: Deep Recommender Models Using Pytorch", https://github.com/maciejkula/spotlight, Sep. 25, 2019, 4 pages.

Grbovic, Mihajlo et al., "Real-Time Personalization Using Embeddings for Search Ranking at Airbnb", Proceedings of the 24th ACM SIGKDD International Conference on Knowledge Discovery & Data Mining, Aug. 19-23, 2018, 10 pages.

Kenthapadi, Krishnaram et al., "Personalized Job Recommendation System at Linkedin: Practical Challenges and Lessons Learned", Interesting Domains, RecSys'17, Aug. 27-31, 2017, pp. 346-347.

Mikolov, Tomas et al., "Distributed Representations of Words and Phrases and Their Compositionality", Oct. 16, 2013, 9 pages.

Paszke, Adam , "Automatic Differentiation in Pytorch", 31st Conference on Neural Information Processing Systems (NIPS 2017), 2017, 4 pages.

Pennington, Jeffrey et al., "GLOVE: Global Vectors for Word Representation", Proceedings of the 2014 Conference on Empirical Methods in Natural Language Processing (EMNLP), Oct. 25-29, 2014, pp. 1532-1543.

Seyler, Dominic et al., "An Information Retrieval Framework for Contextual Suggestion Based on Heterogeneous Information Network Embeddings", Jul. 8-12, 2018, 4 pages.

Smilkov, Daniel et al., "Embedding Projector: Interactive Visualization and Interpretation of Embeddings", 30th Conference on Neural Information Processing Systems (NIPS 2016), Nov. 16, 2016, 4 pages.

Van Der Maaten, Laurens et al., "Visulaizing Data Using t-SNE", Journal of Machine Learning Research 9; 2579-2605, Nov. 2008, 27 pages.

* cited by examiner

300

CROSS-MEDIA TARGETABLE CONTENT RECOMMENDER SYSTEM FOR AUDIENCE EXTENSION IN CONTENT DELIVERY SYSTEMS

FIELD OF THE DISCLOSURE

The subject disclosure relates to a cross-media targetable content recommender system and method for audience extension in content delivery systems.

BACKGROUND

Advertisers specify advertising campaigns for television advertising and for online or digital advertising. In both media, the campaign is specified by target audience and media content such as television programs and websites for display of advertising.

BRIEF DESCRIPTION OF THE DRAWINGS

Reference will now be made to the accompanying drawings, which are not necessarily drawn to scale, and wherein.

DETAILED DESCRIPTION

Figure 1:
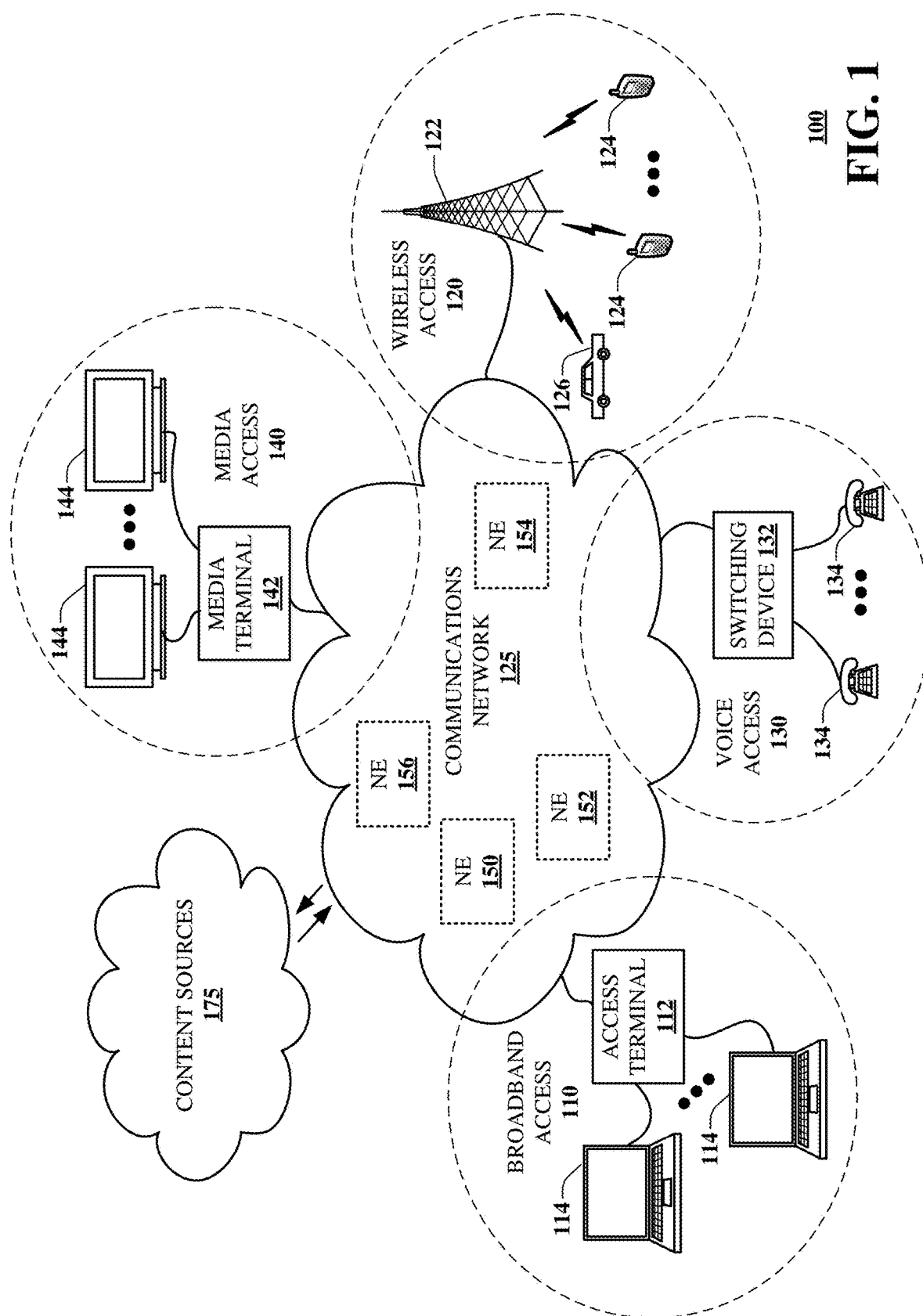
FIG. 1 is a block diagram illustrating an exemplary, non-limiting embodiment of a communications network in accordance with various aspects described herein.

The subject disclosure describes, among other things, illustrative embodiments for recommending content to receive advertising across different media, such as television and online or digital. Content including advertising viewed by an audience in a first medium, such as television, is identified and used to recommend content, such as online websites, in a second medium. An advertiser may initiate or expand an advertising campaign in the second medium using the recommended websites or other content. The audiences in the two media are linked through audience identification information, such as a television household identifier and device or browser identification of online users. Other embodiments are described in the subject disclosure.

One or more aspects of the subject disclosure include collecting television viewership information for viewers of television content items of a television advertising campaign, collecting digital viewership information for online activity by users, joining the television viewership information and the digital viewership information, wherein the joining comprises associating household identifiers of the television viewership information with device identifiers of the digital viewership information, building a content ranking of digital content items closest to the television content items and initiating, by the processing system, a digital advertising campaign with one or more digital content items of the content ranking of digital content items attached to the digital advertising campaign.

One or more aspects of the subject disclosure include identifying television content items targeted by an advertiser for a television advertising campaign, the television content items including one or more television programs displayed to viewers; recommending online content items to be targeted by the advertiser for a digital advertising campaign, including forming a machine learning model that encodes a relationship between the television content items and online content items, the machine learning model including content embeddings based on television content items viewed by a plurality of households and digital content items viewed online by a plurality of online users, training the machine learning model on historical television viewership information and digital browsing data, providing to the machine learning model information about the television content items targeted by the advertiser for the television advertising campaign, and receiving from the machine learning model a ranked list of targetable digital content items as recommended as online content items to be targeted by the advertiser for the digital advertising campaign.

One or more aspects of the subject disclosure include collecting television viewership information for viewers of targeted television content items of a television advertising campaign of an advertiser including receiving a household identifier and a television content identifier for each targeted television content item viewed during the television advertising campaign, collecting digital viewership information for online activity by users, including receiving a website identifier for a website and a device identifier of a device of a user that viewed the website. The subject disclosure further includes associating household identifiers of the television viewership information with device identifiers of the digital viewership information to form an identifier mapping, based on the identifier mapping, building a content mapping between television content identifiers of the television viewership information and website identifiers of the digital viewership information, training a content embeddings model on the content mapping and providing to the content embeddings model television content identifiers of one or more targeted television content items of the advertising campaign. The subject disclosure further includes receiving from the content embeddings model a ranked list of recommended websites for a digital advertising campaign, the recommend websites determined by the content embeddings model to be closest to the television content items targeted by the advertiser for the television advertising campaign, and initiating the digital advertising campaign on one or more of the recommended websites.

Referring now to FIG. 1, a block diagram is shown illustrating an example, non-limiting embodiment of a system 100 in accordance with various aspects described herein. For example, system 100 can facilitate in whole or in part collecting television viewership information for an advertiser's television campaign and recommending digital content items such as websites for a corresponding digital campaign, including developing a deep learning model that encodes the relationship between television content and digital content. The model is trained on historical television viewership data and online browsing data. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
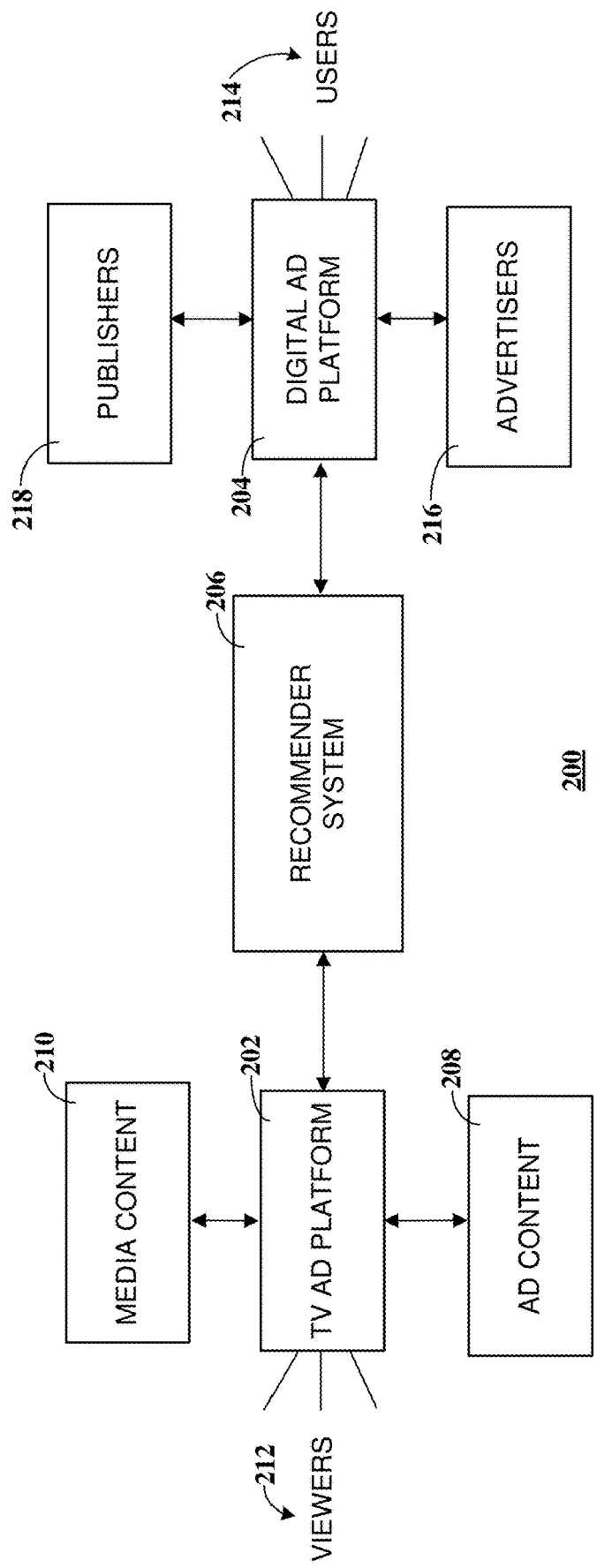
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 is an embodiment of a system and performs functions of a method for extending an advertiser's television audience to an online or digital audience using information about the advertiser's television audience. Digital content or information or data may refer to information accessible over a network such as the internet using a device such as a computer or mobile device equipped with an application program such as an app to access, view and hear and otherwise experience content. Content may include web pages, text, images, graphics, video and audio content items.

Many advertisers have developed advertising efforts to provide media content to advertise products on television. Advertising on television may include providing media content on one or more systems including linear television (TV), data-driven linear TV, addressable TV, connected TV, over-the-top (OTT) networks, web portals, and so on. Advertisers also develop advertising efforts for online campaigns as well. Online or digital advertising campaigns provide content including advertising to websites and other digital properties for viewing by users.

These systems are generally not interoperable with each other and thereby lead to inefficiencies as to how media content slots can be procured from such systems by other media content suppliers. Further, the different systems may have different audiences. For example, conventional linear TV may be more popular with an older audience more familiar with and invested in linear TV broadcasting, while an OTT audience may include younger individuals more open to cord-cutting and using new technology. Digital systems are generally not compatible with television systems, including systems for monitoring ad presentation and performance. Moreover, the pace of television advertising is generally slower and more stable, often planned executed over many months. In contrast, digital advertising often reflects a very high rate of turnover, with ad campaigns being planned and executed over as little as a week or two.

Content providers such as advertisers seek to efficiently provide content, including advertisements, by reducing the costs associated with content provision and improving the return on their investment. However, there are significant technical problems with coordinating both a television ad campaign and a digital ad campaign, for the same or complementary products. Conventionally, advertisers are unable to target users across both television and digital environments. An ad campaign must be developed for a television platform and evaluated for success and improvement. Separately, an ad campaign must be developed for a digital environment and then evaluated and optimized. The television and digital campaigns may bear similarities in terms of appearance, but they conventionally operated separately. For example, while third-part advertising service providers enable advertisers or campaign managers to manage television and digital campaigns in a single venue, the campaign managers must conventionally split their advertising budgets and apportion budget to the television and digital campaigns. Because of this fragmentation, campaign managers are not able to get a top-down view of the content that interests their audiences. Further, buyers of advertising need more decision-making tools to improve workflows and optimize advertising dollars.

Other technical problems exist as well. Buyers of advertising regularly complain that it is too hard to optimize campaigns even if the raw data about their potential customers is there to help with decision making. Buyers further complain of challenges spending full budgets, referred to as "under-delivery," when buying through digital and TV advertising platforms. A method for cross-screen content-linkage audience extension promises to increase the reach and delivery of campaigns by providing a search ranking method to recommend digital supply that is similar to the supply that TV buyers are interested in. Once TV buyers have identified a desirable audience, a similar digital audience may be recommended to the TV buyers. This can bridge the technological gap between television and digital advertising.

Reaching an advertiser's goals, such as delivering advertisements in full and using all the advertising budget, is critical for acquiring and nurturing advertiser business. Delivery is dependent on the size and quality of the audience targeted, where audience size refers to the numbers of users or viewers who see a media content item such as an advertisement, and audience quality refers to the extent to which the audience members a likely to respond favorably to a media content item such as an advertisement.

To address these problems and others, a recommendation system and method recommend additional targetable digital content or supply for advertisers' line items given their original TV targeted content. A deep learning model encodes the relationship between TV and digital content into a low-dimensional embedding space where similar content cluster together. The model is trained on historical TV viewership data combined with digital impression data, click data and conversion data. The algorithm builds content embeddings based on what the user or household watched on TV and what they browsed on Digital platforms. The algorithms provides a ranked list of targetable Digital content to TV advertisers that need to expend their budget to the Digital platform to hit delivery key performance indicators (KPIs). A system and method in accordance with various aspects described herein expand the targetable digital content using already targeted TV content, to achieve the goal of growing the potential audience in a disciplined, data-driven way.

Content providers such as advertisers collect information about one or more audiences for television programming. The information may include demographic information such as age and gender of the viewing audience, psychographic information and geographic information. Media content including advertisements may be assigned to designated media content slots. Such media content slots may be defined by a variety of characteristics including seller policies or buyer policies, including a network or network provider, a geographic area, composition of the desired audience or interests of the desired audience (e.g., demographics, psychographics, or other descriptive properties of an audience), one or more times during which the media content may be shown, limits such as frequency caps on how often the media content may be shown, avoidance of temporal proximity in presentations of competing media content (e.g., avoidance of two competing advertisements being presented in sequence), avoidance of biased targeting of audiences, brand safety policies for preventing presentation of an advertisement with undesirable content, policies for maintaining anonymity and privacy of audiences and individuals being targeted, and other suitable present and future characteristics or policies contemplated by the subject disclosure.

The system 200 allows use of information about TV viewership, merged with digital browsing information, to build a relationship between digital properties such as mobile applications (apps) and websites television properties such as television programs. The advertiser can place media content such as advertisements on both digital properties and on television properties. To expand an audience for media content items, the advertiser who successfully places media content in either the television or digital domain needs to identify properties that are close, in terms of audience interest, in the other domain. In one example, if an advertiser has successfully placed media content on the television program Bleacher Report, which offers content focused on programming about sports, the advertiser would like to find a digital property with an audience with similar interests and proclivity to purchase the advertiser's products, such as ESPN.com, which also has content with a sports focus.

The advertiser, or a buyer of media content slots or a campaign manager who has successfully advertised on television may seek to buy advertising on digital properties. The buyer may have a budget, a time frame and a goal for placement of media content. The goal may include, for example, optimizing a metric such as increasing sales for sports equipment. A provider of online advertising services would like to identify for the buyer information such as a ranked list of websites where website viewers have converted and made a purchase of sports equipment. The provider of online advertising services has a goal of trying to link two different types of content, TV content and digital content. The provider of online advertising services desires to identify for the buyer one or more websites or other digital properties where the buyer will experience similar good performance as was experienced with TV properties.

In an exemplary embodiment, an advertiser initiates a TV advertising campaign. The campaign specifies, for example, ads of the advertiser to be displayed with specified TV content according to a schedule. The schedule may include one or more media content items, such as TV programs, episodes of TV series, movies or films or any other content that might be presented. Subsequently, viewers view the TV content along with the advertiser's advertisements. For example, viewers watch a televised soccer game, the media content item, and see the ads that go along with the game.

The advertiser, or a third-party advertising service provider, collects viewership information. In an example, viewership information may be collected on a household basis, where a household may be defined flexibly according to particular circumstances. In one example, a household includes all devices for television viewing and internet access and all individuals within a residence or a business or other organization. In other examples, the household may be defined by an account for cable television services or internet access services or mobile telephone services, or a combination of these. The household may be defined by the devices, wherever they are located, or by two or more persons, wherever they are located. They need not be located at the same residence or business or other address. The viewership information is associated with a unique household identifier or household ID. Viewership information may include data indicating that the television or other device was on, the designated media content item was selected and the designated advertisement was shown. Viewership information may not indicate whether the media content item or the advertisement was actually seen by a person.

Separately, in this exemplary embodiment, the third-party advertising service provider collects browsing data, advertising impression data, click data and conversion data for online activities. Browsing data includes information about what websites have been visited by devices associated with the household, such as mobile devices, tablet and laptop computers, and other devices that can access remote networks including the internet. Impressions occur when an advertisement is displayed to a viewer, for example on a website viewed on a mobile device. Click data refers to data generated when a user clicks on or otherwise selects an advertisement that is displayed. Conversion data refers to data generated when a user takes a post-click action, such as making a purchase, providing credit card information or an email address, and so on. The impression data, click data and conversion data may be collected for a household, using the flexible definition of a household discussed above. The impression data, click data and conversion data may be associated with a device or household, for example using a cookie data file or other browser identifier device identifier which may be referred to as an ANID. The ANID may be collected from browsing data for user devices. This data generated by monitoring users' online activities may be referred to as digital data.

Further, in this exemplary embodiment, the third-party advertising service provider joins the digital data and the viewership data. The process may generate data pairs including a TV content identifier and a digital content identifier. The data pairs indicate that the same person viewed the media content item identified by the TV content identifier and also visited the website identified by the digital content identifier. Identification or association of a person is approximate; the same person may not have seen both the media content and the digital content, but within a degree of confidence, a person from the same household did view the same content of the data pairs. The viewing of the TV content and the digital content may not have occurred at the same time, but over a specified time frame such as thirty days, for example. The data pairs are interpreted as a signal that the media content item or TV program is somewhat related to the digital content item or website of the same data pair.

This co-occurrence permits the third-party advertising provider to build a confidence ranking of the digital content identifiers that are closest to the TV content identifiers. Based on the confidence ranking, an advertiser can determine, based on a TV content item, what websites should be targeted for an online digital advertising campaign. The result is a list of websites to be targeted that are most related to the TV content item.

Subsequently, the third-party advertising supplier may create a new digital campaign for the advertiser. The third-party advertising supplier may attach the top digital content identifiers, determined from the confidence ranking, to the new digital campaign. The advertiser's new digital campaign is then initiated. The new digital campaign targets users that watched the TV content or other media content item but on a digital supply. When users access websites and other digital media, the user will see digital advertising for the products advertised on TV content.

This has a benefit of expanding the audience for the advertiser. The advertiser will now be targeting websites where viewers have demonstrated a favorable reaction to the product when the product was advertised on television. The favorable response of the television audience is used to create and expand the digital audience. The new digital campaign is directed to customers that might be interested in the advertiser's products, based on the interest previously expressed by the television audience.

In another embodiment, data collected about digital advertising can be used to recommend to an advertiser media content channels or media content items such as television programs on which to advertise. Television campaigns have a cycle time of, for example, six months. This is a typical amount of time to set up and implement a television advertising campaign, and collect advertising data. Digital campaigns, in contrast, have a much shorter cycle time. A digital advertising campaign can be initiated and run in as little as one day in some examples, and run over, for example, two weeks. The digital campaign is much more reactive than the TV campaign. The TV campaign may be more stable in nature, since its duration is longer. Using household identifiers, the actual households are known and therefore more stable in nature. In contrast, digital identifiers such as cookies may form a messier dataset that is less regular and less stable than the household identifiers. The digital identifiers may be mapped to household identifiers and used to make recommendations to the advertiser.

Further, the results of each campaign may be used in a feedback loop for campaign optimization. For example, an advertiser may initiate a TV campaign and use the results of the TV campaign to optimize a digital campaign. The results of the digital campaign may then be used to optimize a next wave of the television campaign, etc.

Referring now to FIG. 2A, the system 200 includes a TV ad platform 202, a digital ad platform 204 and a recommender system 206. The TV ad platform 202 operates to coordinate placement of media content items from a media content source 208 with media content items from a media content source 210 such as television programming. The media content items from a media content source 208 may include advertisements and other media content items. The media content items from a media content source 210 may include television programming such as episodes of television programs, sports events, movies and films, and other video and audio items. The TV ad platform 202 may be formed from any suitable combination of data processing systems, data storage systems including memory and databases, network interfaces and user interface equipment.

The TV ad platform 202 combines media content such as TV programming and advertisements and provide television content to viewers 212. The television content may be provided in any suitable fashion over any suitable system, including linear television (TV), data-driven linear TV, addressable TV, connected TV, over-the-top (OTT) networks, satellite television, web portals, and so on, including combinations of these. Viewers may select television programming to view, such as by selecting a channel on a television or other receiver apparatus, order a particular content item for delivery, or in any other suitable fashion.

In at least cases, viewership information may be collected by the TV ad platform 202. Viewership information generally includes at least information about a TV program viewed and one or more advertisements viewed, and a household identifier at which the TV program and the one or more advertisements were viewed. Suitable apparatus and method for determining a household identifier is disclosed in U.S. patent application Ser. No. 17/100,375 entitled AUTOMATIC CLASSIFICATION OF HOUSEHOLDS BASED ON CONTENT CONSUMPTION, filed Nov. 20, 2020, and U.S. patent application Ser. No. 17/100,386 entitled DEVICE TOPOLOGICAL SIGNATURES FOR IDENTIFYING AND CLASSIFYING MOBILE DEVICE USERS BASED ON MOBILE BROWSING PATTERNS filed Nov. 20, 2020, both of which applications are incorporated herein in their entirety by this reference. The viewership information may be automatically collected by the TV ad platform 202 or automatically returned from viewers 212 to the TV ad platform 202, or obtained by the TV ad platform 202 in any suitable fashion.

Viewership information in one example embodiment includes a household identifier referred to as a MAC_HHID and a television content identifier referred to as TV_Content_ID. The household identifier identifies a household at which the television content identified by the television content identifier was viewed by viewers 212. A household may be defined in any suitable fashion. In an example, a household includes all devices for television viewing and internet access and all individuals within a residence or a business or other organization. In other examples, the household may be defined by an account for cable television services or internet access services or mobile telephone services, or a combination of these. The household may be defined by the devices, wherever they are located, or by two or more persons, wherever they are located. They need not be located at the same residence or business or other address. The viewership information is associated with a unique household identifier or household ID.

The digital ad platform 204 provides online content and advertising to users such as users 214. The digital ad platform 204 provides advertising content from advertisers 216 along with digital content from publishers 218 to users 214. The digital content from publishers 218 generally includes information such as web pages, video, audio and other information. The advertising content from advertisers 216 generally includes advertising such as banner ads and other types of ads placed on web pages of the publishers 218. The users 214 viewing digital content including digital advertising may include at least some of the viewers 212 of television content and television programming provided by the TV ad platform 202.

The recommender system 206 provides recommendations to television advertisers. The recommendations provided by the recommender system 206 may include one or more digital properties such as web pages on which the television advertisers may choose to place digital advertisements. The recommender system 206 may receive information from the TV ad platform such as household identifiers MAC-HHID and television content identifiers TV_Content_ID. The recommendations may be provided in any suitable manner, including using the system and method described herein.

Figure 2B:
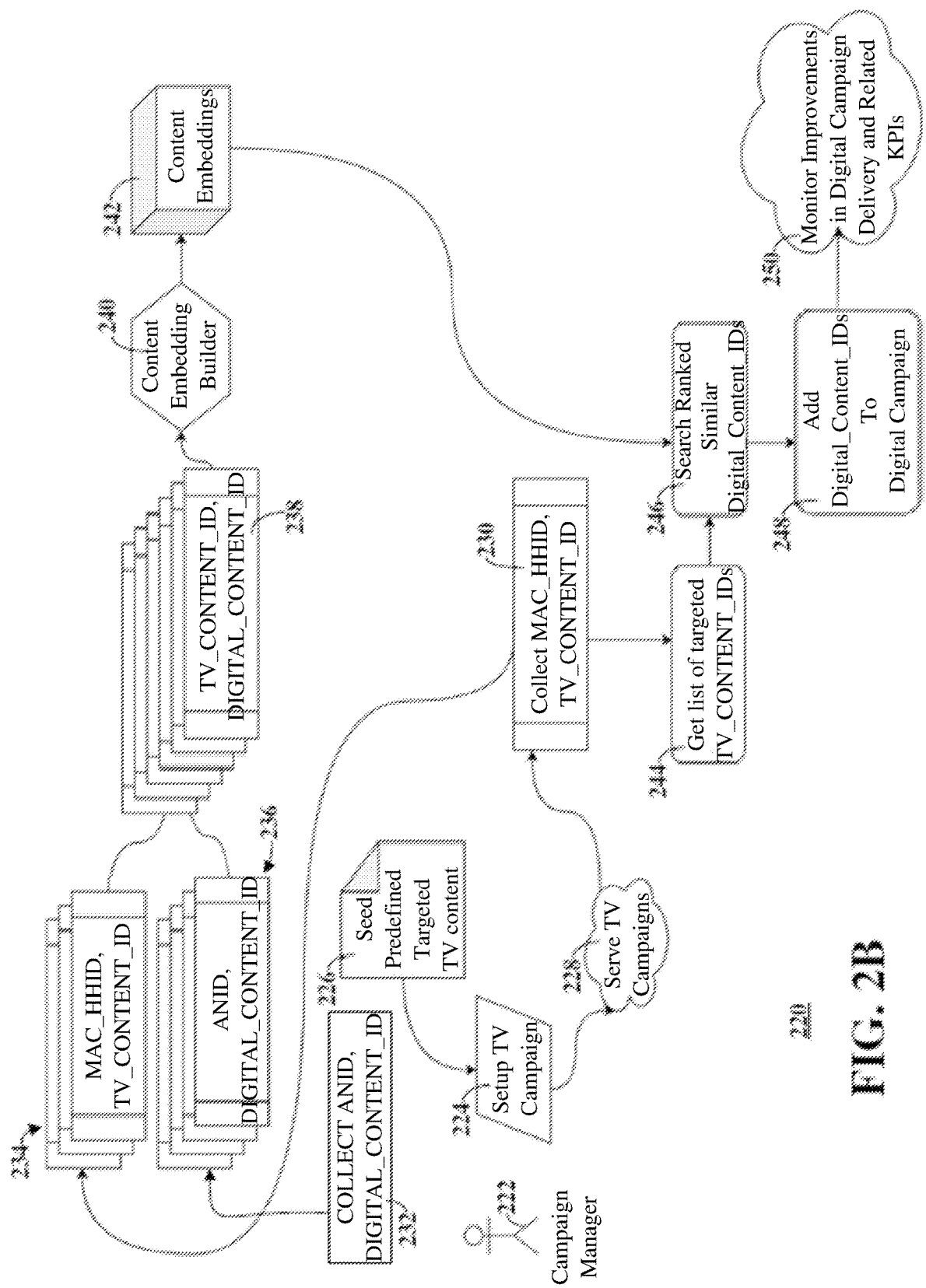
FIG. 2B is a block diagram of a system and process flow for providing recommendations in a system such as the system of FIG. 2A.

Referring now to FIG. 2B, it shows a flow diagram illustrating a process 220 for providing recommendations to a television advertiser of digital properties to extend an audience for a television advertising campaign. The process 220 may be implemented in conjunction with the system 200 of FIG. 2A. In FIG. 2B, a campaign manager 222 is associated with an advertiser, or working on behalf of an advertiser, and one or more television advertising campaigns. The campaign manager 202 has options to place media content items including advertising on a television platform, a digital platform, or both. The television platform will automatically provide advertising to viewers of television programming on user devices according to an arrangement between the advertiser and a television service provider. The digital platform will similarly automatically provide online advertisements to web pages provided by a digital or online network provider.

In a typical embodiment, the campaign manager 222 or an advertiser will have to specifically opt-in to the process 220. Collecting information about viewership of advertising content items and other content items is thus voluntary and with the consent of the advertiser.

The campaign manager 222 may have substantial knowledge and experience with and knowledge of television advertising, but relatively less knowledge and experience of digital advertising. The campaign manager 222 requires assistance and guidance migrating a campaign from the television platform to a digital platform, or extending an advertising budget to a digital platform to expand the audience for the brand or product being advertised. The campaign manager 222 would like to determine, based on content that is successful on the TV advertising platform, content that should be selected to find good customers on the digital advertising platform. In other words, the campaign manager 222 must determine what websites to advertise on to successfully promote a product on the digital platform. In a typical situation, there are many more candidate websites than TV programs or channels. Further, some potentially successful websites may not be well-known or even known at all to the campaign manager 222. The campaign manager 222 requires automatically-generated recommendations of websites to place ads.

Initially, step 224, the campaign manager sets up a TV advertising campaign. As noted, setting up the campaign may include opting-in to the process 220 to collect information about viewership. Setting up a campaign may further include, for example, defining a product to be advertised, defining an ad creative, such as video or audio of a television commercial, and defining terms of the campaign. Terms of the campaign may include a campaign budget, or how much money is to be spent on the campaign, a campaign duration, including a campaign start date and a campaign stop date, and campaign channels. The campaign channels may include television properties on which the creatives are displayed, such as TV networks, TV programs and TV episodes, for example. Terms of the campaign may further include a specified demographic of the audience for the content and the advertisement, such as age and gender of the viewing audience. In some examples, the campaign manager 222 may specify information about the desired audience and where media content should be placed in media content slots. Such media content slots may be defined by a variety of characteristics such as seller or buyer policies, including a network or network provider, a geographic area, composition of the desired audience or interests of the desired audience (e.g., demographics, psychographics, or other descriptive properties of an audience), one or more times during which the media content may be shown, limits such as frequency caps on how often the media content may be shown, etc.

In some examples, step 224 includes receiving predefined targeted TV content to seed the TV campaign. For example, the campaign manager 222 or the campaign may have a preexisting arrangement to provide advertising to particular TV content, such as a contract to provide athletic shoe advertising during a soccer match broadcast on a particular network. The predefined targeted TV content 226 is used to establish the terms of the TV campaign in step 224. The predefined targeted TV content 226 may be received from any suitable source.

At step 228, the TV campaign is served. For example, advertisements selected or prepared as part of the TV campaign at step 224 are communicated to viewers according to terms of the campaign. The advertisements may be served, for example, from a TV advertising platform such as TV ad platform 202 of FIG. 2A. The ads may be served as media content items in specified media content slots that match the desired audience. The serving may be done automatically, by matching the desired audience specified by the campaign manager 222 or advertiser with available media content slots provided by TV programmers or TV service providers. For example, the desired audience may specify a demographic age and gender and geographic location of the audience. A TV service provider, such as a satellite TV service provider, may provide the commercial in the specified media content slot.

As the TV campaign is served, viewership information 230 is collected. In the exemplary embodiment, the viewership information 230 includes information about who viewed the TV content and associated advertising, and information about what TV content was viewed. Any suitable or available viewership information 230 may be collected and processed. The viewership information may include household identification information, designated in FIG. 2B as MAC_HHID, and television content identification information, designated in FIG. 2B and TV_Content_ID. Thus, while the audience is watching the TV content, information about who is watching what, when, is returned. In typical embodiments, the information is completely anonymous to maintain privacy and confidentiality. No actual identification information for a household is collected. Instead, the household identification information is only an approximation of who watched the content item. The household identification information represents a household or group of households that viewed a particular content item defined by the television content identification information. Even if more specific identification information is available such as an account number for a television service subscriber, in embodiments the more specific identification information is deliberately anonymized to maintain privacy.

As noted, the household identification information is linked to television content identification information. The television content identification information may be at various levels of granularity. The television content identification information may define a genre or category of television programming, such as sports or drama. In other examples, the television content identification information may define a particular sports game or match on a specific date. In still other examples, the television content identification information may define an episode of a television series. Timing information may be included as well but is not necessary for the process 220. The household identification information MAC_HHID for a group of households and the television content identification information TV_Content_ID for the group of households, are collected as pairs and stored as household viewership information 234.

In a separate process 232, digital content and digital advertising is served on a digital advertising platform such as digital ad platform 204 shown in FIG. 2A. The digital advertising platform continuously serves impressions for a variety of digital content. The digital content includes text, video, audio and other information served, for example on web pages in response to received content requests from users. The content requests may be received from user devices including mobile devices or other devices such as laptop, desktop and tablet computers, of the users. The user devices typically include a browser program, or browser, for displaying digital content including web pages and for navigating a network such as the internet. The users browse to web pages and select content to view. As a web page or other content is served, advertising in the form on impressions or digital media content items is served to the users on the web pages. The advertising may be termed impressions, or counted as impressions viewed by users.

As digital content is served, digital viewership information is collected in process 232. In one example, digital viewership information includes a cookie data file or other device identifier. This identifier is collected from users and may be referred to as an AppNexus identifier or ANID. The ANID may be assigned by the digital platform to a user's browser or device, which allows the digital platform to automatically recognize the user's browser or device the next time it visits the digital platform. Any type of digital-side identifier may be used in place of or conjunction with the ANID to identify a user viewing particular digital content. The digital-side identifier for identifying a user device or browser may be referred to collectively as a device identifier.

Further in this example, the digital viewership information includes digital content identification information which may be referred to as DIGITAL_CONTENT_ID. In one example, the digital content information includes a uniform resource locator (URL) or other website identifier for a webpage visited by the browser of a user or device associated with the ANID. The digital content identification information DIGITAL_CONTENT_ID and the ANID are stored as pairs by the digital platform as digital viewership information 236.

In exemplary embodiments, in a process, the digital viewership information 236 is joined with the household viewership information 234 to build content rankings of the digital content identification information for digital content items that are closest to television content items identified by the television content identification information. TV_CONTENT_ID and DIGITAL_CONTENT_ID pairs 238 are mapped together based on relationship of the household identifiers MAC_HHID and ANID. The relationship between viewers of the TV content and viewers of the digital content may only be approximate and need not be identical. The TV_CONTENT_ID and DIGITAL_CONTENT_ID pairs 238 are used by a content embedding builder 240 to develop a content embeddings model 242. Subsequently, a list of targeted TV_CONTENT_IDs 244 is received and used with the content embeddings model 242 to search for similar digital content items, step 246, producing a list of similar digital content items. The DIGITAL_CONTENT_IDs for the similar digital content items are added to the digital campaign for the advertiser, step 248, and the campaign is subsequently monitored, step 250. The process may be performed, for example, by recommender system 206 of FIG. 2A. The process uses the television viewership information 234 and the digital viewership information to develop a machine learning model and then uses the model to build the content rankings.

Figure 2C:
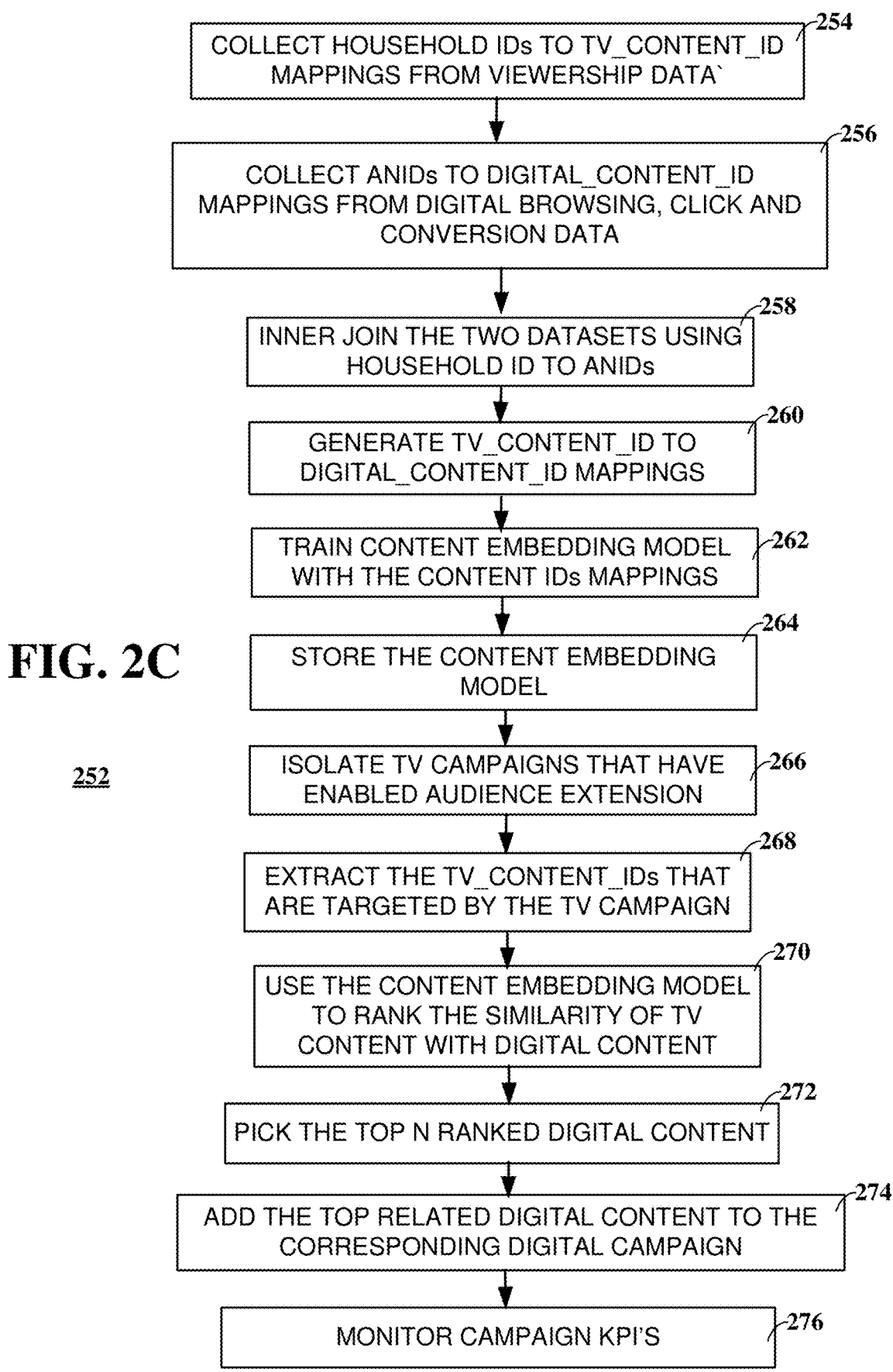
FIG. 2C depicts an illustrative embodiment of a method in accordance with various aspects described herein.

FIG. 2C depicts an illustrative embodiment of a method 252 in accordance with various aspects described herein. In the method 252, digital viewership information is joined with the household television viewership information associated with advertising of a television advertiser to build content rankings of the digital content identification information for digital content items that are closest to television content items identified by the television content identification information. In particular, the method 252 illustrates a model training algorithm for a machine learning model.

The method begins at step 254 where household identification information and TV content identification information is collected from television viewership data. As discussed herein, the household identification information generally or approximately identifies a household that viewed a particular television content item. The television content item may be a single program, such as a sports or other event. The television content item may be an episode of a series, such as a drama or comedy series. The television content item may only be identified by a genre or type of program, such as sports. The household identification information in typical embodiments is anonymized to remove any confidential or identifying information. As indicated in FIG. 2B, the household identification information and TV content identification information are stored as household viewership information 234 in pairs labelled MAC_HHID and TV_CONTENT_ID.

At step 256, digital content identification information and digital viewership information are collected and stored. The digital viewership information may include a cookie data file, ANID or other information which identifies a user, a device or a browser on a device. The digital identification information identifies a digital content item viewed by a user and may be, for example, a URL or other network address information. As indicated in FIG. 2B, the digital content identification information labelled DIGITAL_CONTENT_ID and the digital identification information labelled ANID are stored as pairs as digital viewership information 236.

Beginning at step 258, a model training algorithm operates to train a machine learning model, illustrated as content embeddings model 242 in FIG. 2B. In step 258, the television household identification and ANID are joined in that an identification is made between members of the household devices or browsers that have seen digital content. The identification may only be approximate and not identical. The identification may be a matching, based on a particular level of confidence. For example, a confidence parameter may be established defining the level of confidence that a household identified by a particular MAC_HHID value is associated with a user identified by a particular ANID value. The confidence parameter may be compared with a confidence threshold. If the confidence parameter exceeds the confidence threshold, the device associated with the ANID and the household associated with the MAC_HHID are assumed to be correlated. Other correlation techniques may be used as well. Generally, the joining is based on an understanding that TV viewers who viewed an item of television content are similar to and in some way identified with viewers who viewed the digital content. This will be true even if the identical individual did not view the same television and digital content, but only similar individuals or loosely correlated individuals saw the same content items. The joining provides a linkage between two content identifiers, the television content identification information and the digital content information associated with the MAC_HHID and the ANID, respectively.

The input to the model training algorithm is four columns of viewership data, including values for MAC_HHID and TV_CONTENT_ID and DIGITAL_CONTENT_ID and ANID. The result a linkage of digital content identification information, DIGITAL_CONTENT_ID, to TV content identification information, TV_CONTENT_ID. The linkage indicates that the two identified content items were seen by the same entity. In this instance, entity is used loosely to mean someone associated with the household designated by a MAC_HHID value and someone associated with a device or browser designated by an ANID value.

The result of step 258 is a set of (MAC_HHID, ANID) pairs that can be used in step 260 to generate TV_CONTENT_ID and DIGITAL_CONTENT_ID mappings. This may be referred to as content ID mappings as illustrated in FIG. 2B as TV_CONTENT_ID and DIGITAL_CONTENT_ID pairs 238.

In step 262, a content embedding model is trained with the content ID mappings. A co-occurrence value may be computed TV content identification information and digital content information. The machine learning model is trained with the co-occurrence pairs and stored for subsequent use. Any suitable machine learning model may be used. In some embodiments, the model may be a trained embedding space. Where a large amount of data is used, such as many television content identifiers and many digital content identifiers, encoding the data using an embedding space may be preferred. The embedding reduces the amount of data processing required by knowledge compression. Training the model may occur on any appropriate basis or time frame, such as once per week. Preferably, the training occurs in a batch process, offline. Once trained, the model may be stored for online use, step 264, such as content embeddings model 242 illustrated in FIG. 2B.

At step 266, TV advertising campaigns that have enabled audience extension are identified. In some embodiments, a TV advertiser must opt-in to the process of collecting viewership data and using the viewership data to identify a digital audience that may be interested in the media content items or advertisements of the TV advertiser.

At step 268, television content items that the television advertiser targeted for the television advertising campaign are identified. The advertiser may establish a set of television targeting variables that define the television audience of interest, or aspects of the television audience the advertiser interesting to the advertiser as potential customers for the advertiser's product. The identified television content items may be associated with a content identification information or TV_CONTENT_ID value. For example, the television advertising campaign may be directed to sporting events, or a particular soccer match, or television news programming related to scientific research on vaccines. Further, the campaign may be targeted at a particular demographic, psychographic or geographic group, such as men age 18-55. The advertising campaign assigns media content items or advertisements to one or more media content slots or advertising opportunities during the presentation of programming or television content items matching the campaign's targets. The television content items may be identified by a TV_CONTENT_ID value. The result of step 268 is a set of TV_CONTENT_ID values corresponding to television programs during which advertisements of the advertiser's campaign were displayed, as recoded in viewership information collected at step 254.

At step 270, the set of TV_CONTENT_ID values is provided as an input to a machine learning model, such as content embeddings model 242 of FIG. 2B. The embeddings operates to find where an item of content lies in the overall space of known content. An embedding is a mapping of a discrete variable to a vector of continuous numbers. Embeddings may be low-dimensional, learned continuous vector representations of discrete variables. Embedding spaces may be useful to reduce the dimensionality of categorical variables and to meaningfully represent categories in the transformed space. An embedding has a useful purpose to find nearest neighbors in the embedding space. These can be used, for example, to make recommendations based on user interests or cluster categories. The content embeddings model 242 returns a ranked list of digital content identification information, or DIGITAL_CONTENT_ID values, that correspond to digital content items which match most closely television content items corresponding to the set of TV_CONTENT_ID values provided as an input to the content embeddings model 242 at the end of step 270. The highest-ranked digital content items are most similar to the television content items targeted by the television advertising campaign.

In step 272, one or more of the ranked digital content items are selected for a digital advertising campaign of the advertiser. A variable number N of values may be selected, where N is any suitable number based on advertising goals, budget, etc. The digital content items correspond to websites or other network locations with content most similar to the television programs identified in the television viewership information.

At step 274, the selected digital content items are added to a digital campaign for the advertiser. The digital campaign may be new or may be preexisting. The digital campaign is defined by targeting variables established by the advertiser. Digital targeting variables may match the television targeting variables or may more, fewer or different targeting variables. For example, the television campaign may be directed to men who are soccer fans. The corresponding digital campaign may be directed to men who are soccer fans, age 18-30, or men and women who are soccer fans. The digital campaign includes a list of websites to which advertisements are provided as impressions or in any form. The selected digital content items, including websites, are added to this list, in one embodiment. Other embodiments may extend the audience for the advertiser's content items in any suitable manner.

At step 276, as the digital campaign progresses, the advertiser's digital ads are provided to websites as users access the websites by means of their devices and browsers. As the users interact with the websites and the advertisements, information about the interaction may be gathered, such as impressions, click-throughs and further actions such as purchases made through a website. The interaction information is reported to or collected by the digital platform. The interaction information may be processes and monitored and compared with key performance indicators (KPIs) established by the advertiser.

The embodiments of FIG. 2B and FIG. 2C illustrate a system and method of identifying a television audience for an advertising campaign using television viewership information, identifying a related digital audience based on household identification information such as MAC_HHID and digital identification information such as ANID, and adding the related digital audience to the advertising campaign. An alternative embodiment can use a reverse process in which a digital audience for an advertising campaign is identified based on digital viewership information which links ANIDs and websites viewed. The ANID or other digital identification information can be linked to MAC_HHIDs or other household identification information. Using a content embeddings, a ranked list of television content identification information, or TV_CONTENT_ID values, that correspond to TV content items which match most closely the digital content items or websites viewed by persons in the set of DIGITAL_CONTENT_ID values. From the TV_CONTENT_ID values and television viewership information, households may be identified and included in an audience to extend the digital audience to a television audience. Details of the reverse process will be evident to those of ordinary skill.

Television advertising campaigns typically have a longer cycle time than a digital advertising campaign. A television campaign may be run over a six months' time period whereas a digital campaign may be run over a two weeks' time period. The data from the television campaign is collected over a longer time period and tends to be more stable. The households are relatively fixed and not transient. In the embodiment of FIG. 2B and FIG. 2C, the television viewership data is collected first and used to extend the audience to the digital campaign. In contrast, the data collected by the digital platform for a digital campaign using ANIDs or other information tends to be messier and less stable. Mapping information from the messier ANID data to the household data may require additional processing of filtering in some embodiments to ensure reliable operation.

In this manner, an advertiser more familiar with digital advertising can receive assistance in identifying television content which may be appropriate for advertising.

Figure 2D:
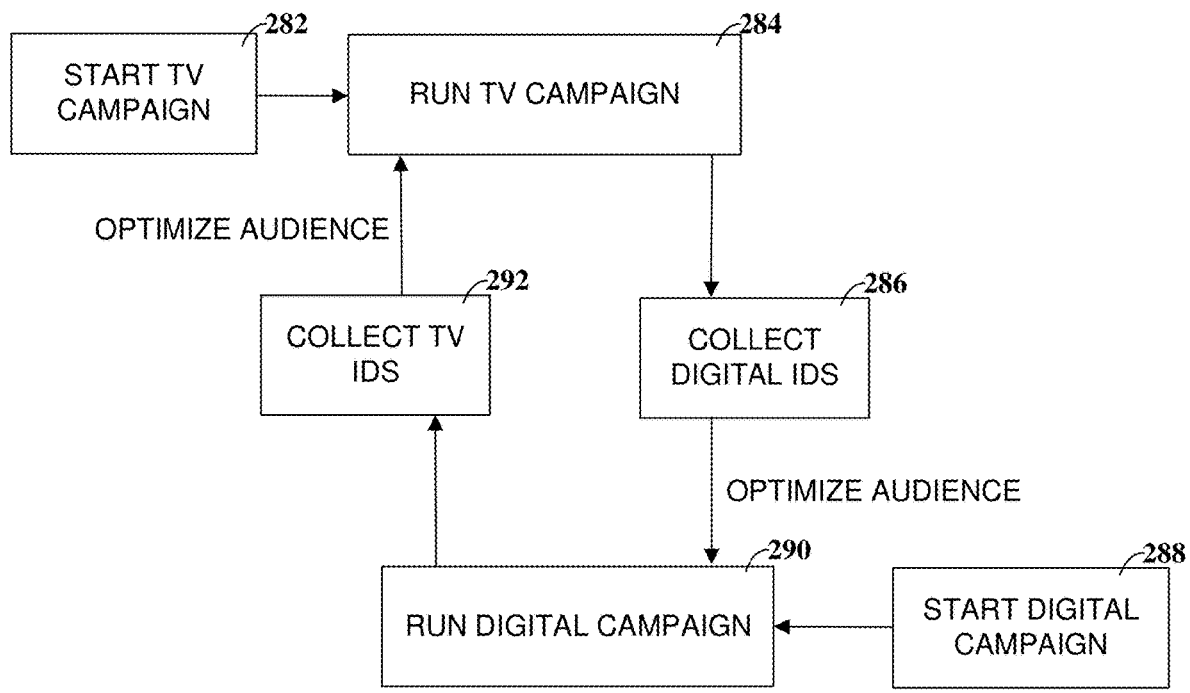
FIG. 2D depicts an illustrative embodiment of a method in accordance with various aspects described herein.

FIG. 2D depicts an illustrative embodiment of a method 280 in accordance with various aspects described herein. In the method 280, a feedback loop between a television advertising campaign of an advertiser on a television platform and a digital advertising campaign of the advertiser on a digital platform is used to improve or optimize performance of both the television advertising campaign and the digital advertising campaign. In the embodiment of FIG. 2D, at step 282 the television advertising campaign is initiated. Initiation may include receiving advertiser specifications defining targeting variables for the television audience of interest, identifying television content items such as television programs on which advertisements should be displayed, specifying timing such as start and stop dates and budget and other items. At step 284, the television ad campaign run according to advertiser specifications.

At step 286, digital identification information is collected. The process of step 286 may match or may be based on the process 220 of FIG. 2B or the method 252 of FIG. 2C, for example. The digital identification information in some embodiments includes a set of ANIDs or other browser or device identifiers. The set of ANIDs identify audience members of a digital audience that is similar to the television audience that was targeted by the advertiser in the television campaign running at step 284. A content embeddings model may be used to identify a set of top-ranked digital content.

Separately and relatedly, the advertiser starts a digital campaign at step 288. Starting the digital campaign may include receiving advertiser specifications defining targeting variables for the digital audience of interest, identifying digital content items such as web sites on which advertisements should be displayed, specifying timing such as start and stop dates and budget and other items for the digital campaign. At step 290, the television ad campaign run according to advertiser specifications.

The set of ANIDs collected at step 286 may be used to extend or modify or optimize the audience of the digital campaign. As the digital campaign is run at step 290, the digital platform collects digital viewership information including ANIDs and digital content identifiers, such as URLs of websites visited by browsers associated with the ANIDs. The top-ranked digital content identified at step 286 may be added to the digital campaign running at step 290, similar to the process illustrated in FIG. 2C.

At step 292, as the digital campaign is run, television identification information is collected. The process of step 292 may be analogous to the process 220 of FIG. 2B or the method 252 of FIG. 2C, for example. The television identification information in some embodiments includes a set of MAC_HHIDs or household identifiers. The set of MAC_HHIDs identify audience members of a television audience that is similar to the digital audience that was targeted by the advertiser in the digital campaign running at step 290. A content embeddings model may be used to identify a set of top-ranked television content. The top-ranked television content may be used to extend or optimize the audience of the television campaign running at step 284. The feedback loop illustrated in FIG. 2D may be updated according to any suitable time frame.

While for purposes of simplicity of explanation, the respective processes are shown and described as a series of blocks in FIGS. 2B, 2C and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In embodiments, the disclosed system and method are compliant with the General Data Protection Regulation (GDPR) and the California Consumer Privacy Act (CCPA) since no data is collected from protected countries or states. In embodiments, the system exclusively collects, models and uses CCPA-compliant US user data. In embodiments, the system operates on an opt-in basis at an advertiser campaign level. An advertiser may agree to participate in use and operation of the system and method. Users also may agree to participate and have their data accessed and processed. Both advertisers and users may need to manually enable the features described herein to ensure consent to use of data.

Figure 3:
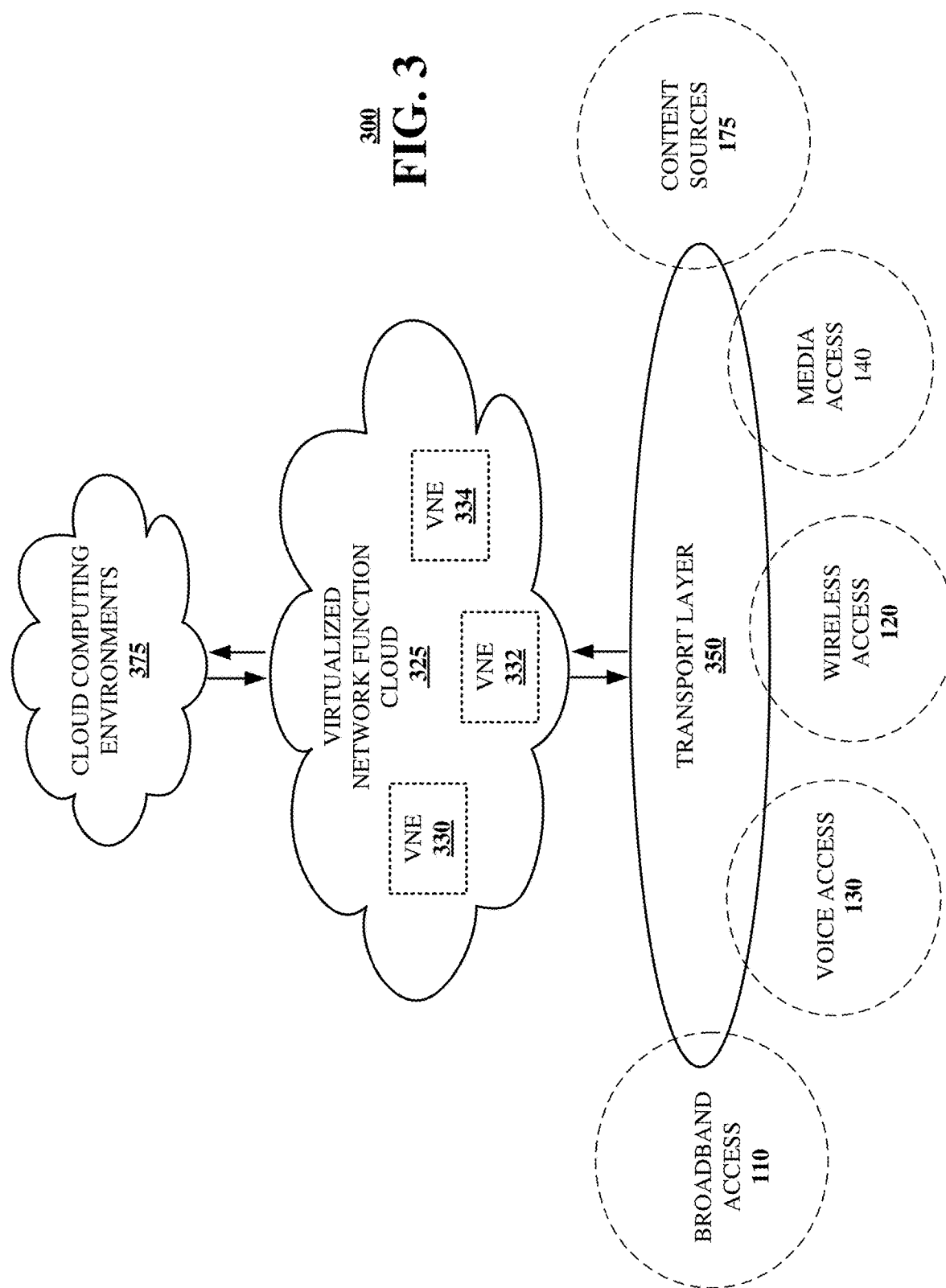
FIG. 3 is a block diagram illustrating an example, non-limiting embodiment of a virtualized communication network in accordance with various aspects described herein.

Referring now to FIG. 3, a block diagram of a virtualized communication network 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and process 220 presented in FIGS. 1, 2A, 2B, 2C, and 3. For example, virtualized communication network 300 can facilitate in whole or in part collecting television viewership information for an advertiser's television campaign and recommending digital content items such as websites for a corresponding digital campaign, including developing a deep learning model that encodes the relationship between television content and digital content. The model is trained on historical television viewership data and online browsing data.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
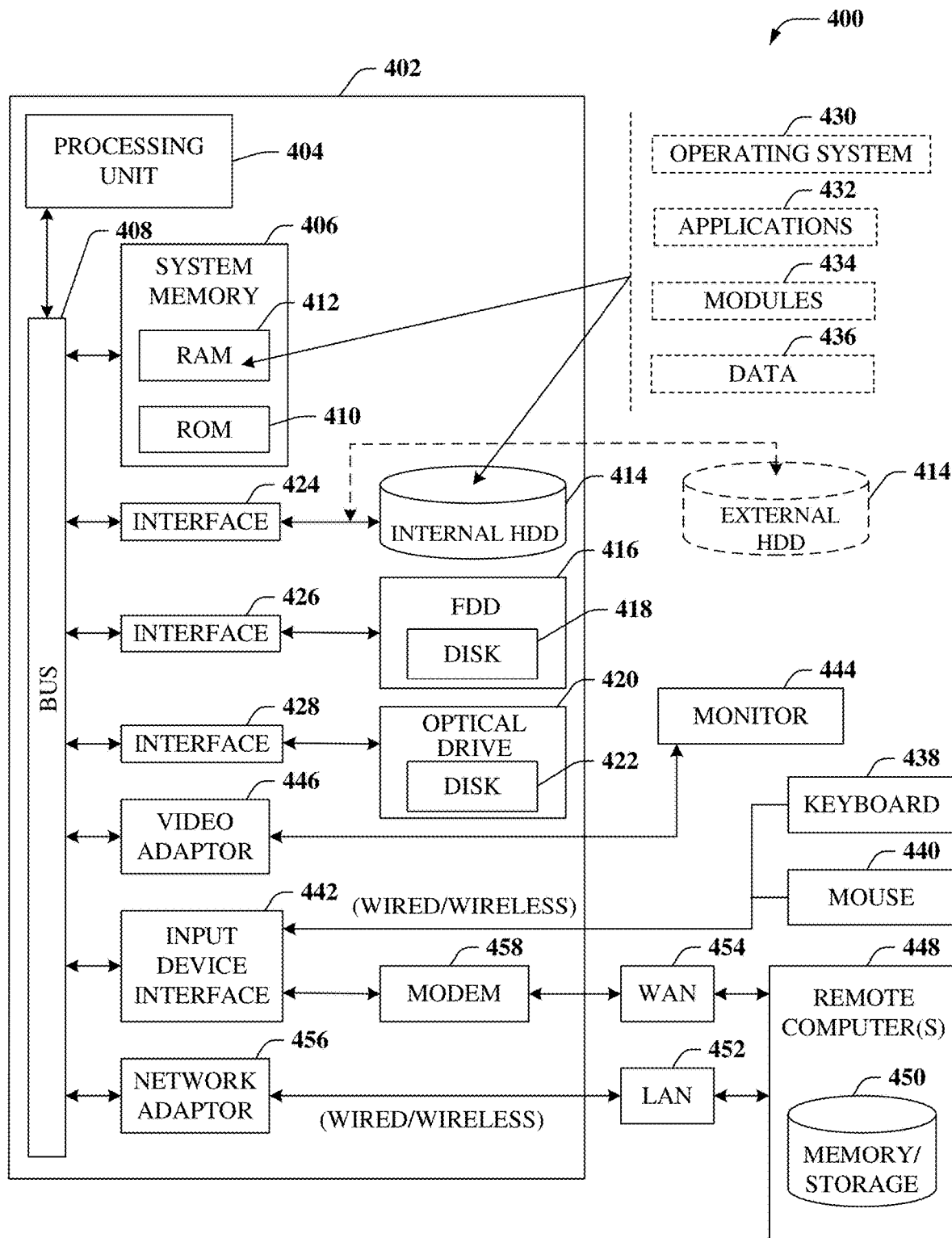
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part collecting television viewership information for an advertiser's television campaign and recommending digital content items such as websites for a corresponding digital campaign, including developing a deep learning model that encodes the relationship between television content and digital content. The model is trained on historical television viewership data and online browsing data.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
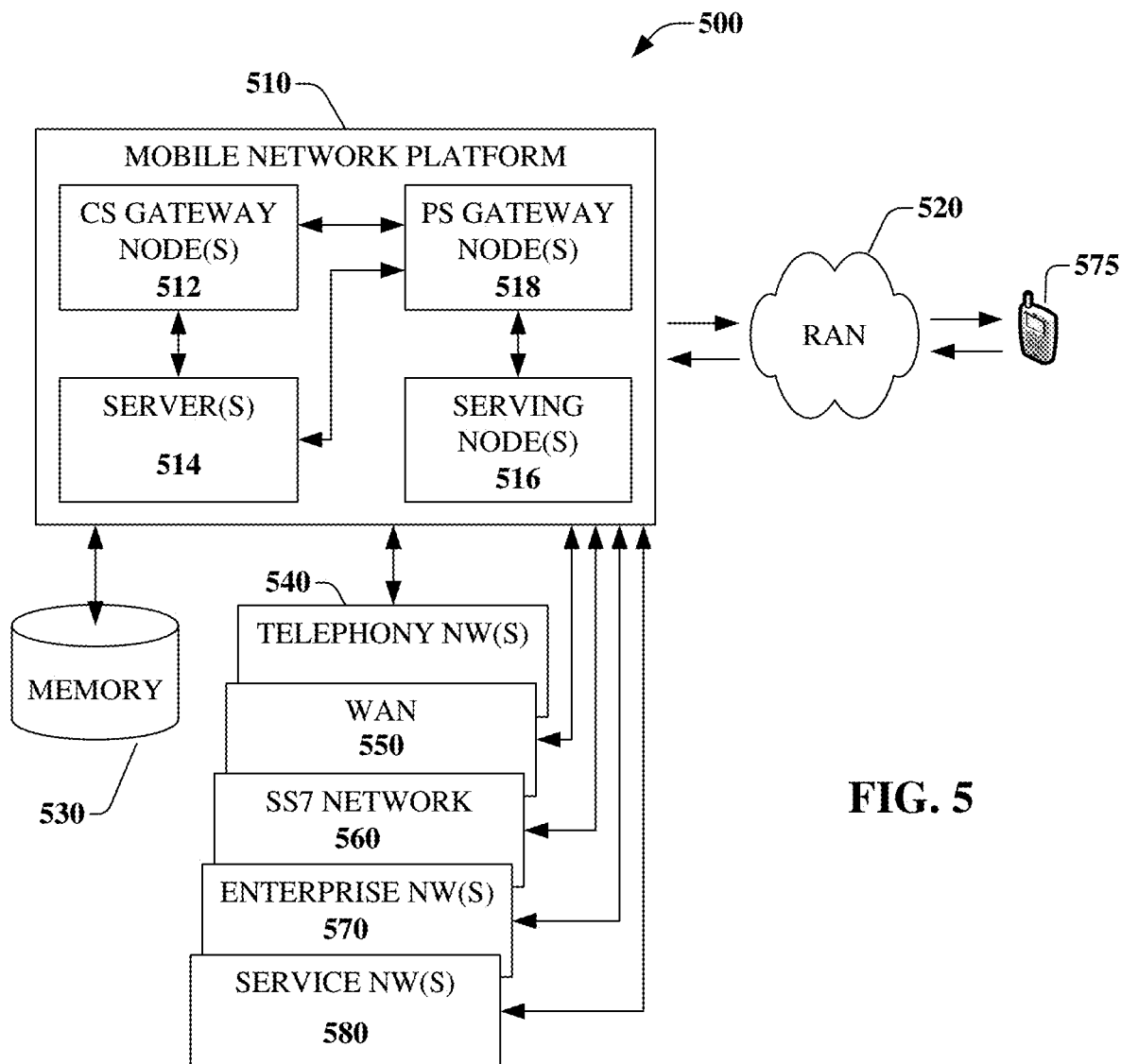
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part collecting television viewership information for an advertiser's television campaign and recommending digital content items such as websites for a corresponding digital campaign, including developing a deep learning model that encodes the relationship between television content and digital content. The model is trained on historical television viewership data and online browsing data. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
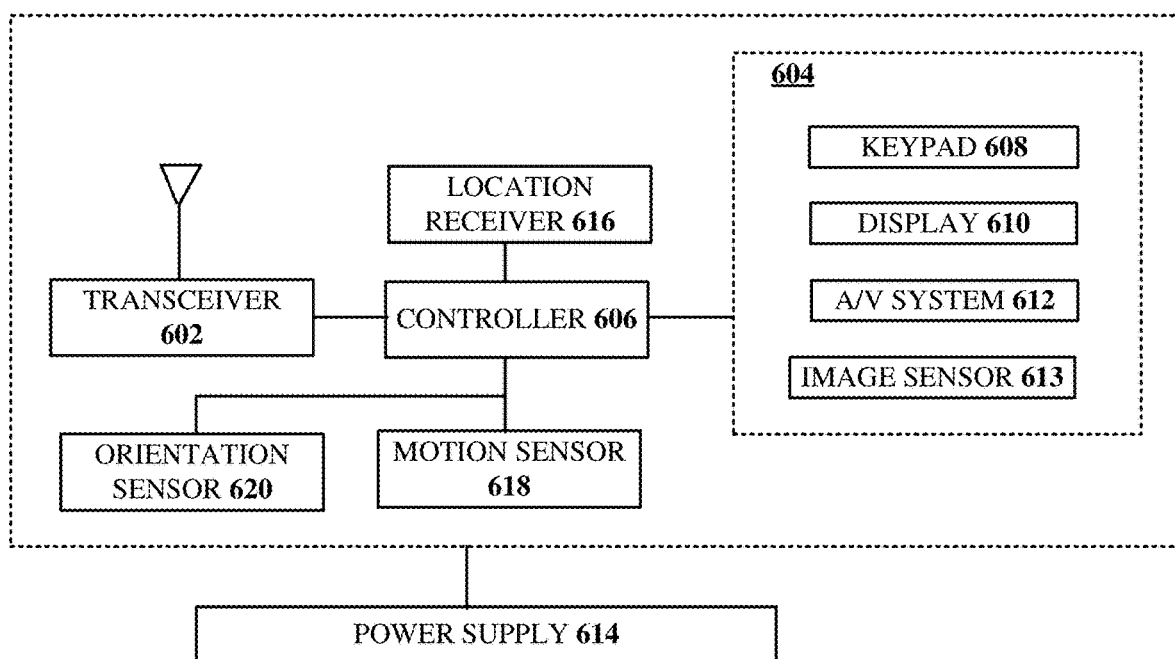
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part collecting television viewership information for an advertiser's television campaign and recommending digital content items such as websites for a corresponding digital campaign, including developing a deep learning model that encodes the relationship between television content and digital content. The model is trained on historical television viewership data and online browsing data.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:
    collecting, by a processing system including a processor, television viewership information for viewers of first television content items of a television advertising campaign;
    collecting, by the processing system, digital viewership information representative of online activity with first digital content items;
    forming content identifier mappings by mapping, by the processing system, the first television content items of the television viewership information to the first digital content items identified in the digital viewership information using household identifiers of the television viewership information and device identifiers of the digital viewership information;
    training, by the processing system, a content embeddings model based upon the content identifier mappings, the content embeddings model encoding a relationship between the first television content items of the television viewership information and the first digital content items of the digital viewership information;
    providing, by the processing system, a representation of a second television content item to the content embeddings model;
    building, by the processing system and based upon output of the content embeddings model responsive to receipt of the representation of the second television content item by the content embeddings model, a content ranking of second digital content items; and
    causing, by the processing system and based upon the content ranking of the second digital content items, a digital ad to be served to a client device on which one or more of the second digital content items is displayed.

2. The method of claim 1, wherein the collecting digital viewership information comprises:
    collecting, by the processing system, impression data, click through data and conversion data for the online activity.

3. The method of claim 2, further comprising:
    identifying, by the processing system, the first digital content items and device identifiers of the digital viewership information.

4. The method of claim 2, further comprising:
    collecting, by the processing system, browsing data for the online activity; and
    identifying, by the processing system, one or more websites among the browsing data.

5. The method of claim 1, wherein the collecting television viewership information comprises:
    receiving, by the processing system, television content identification information for the first television content items;
    receiving, by the processing system, a respective household identifier for each respective television content item in the first television content items, wherein the respective household identifier comprises identification information for a respective household viewing the each respective television content item; and
    anonymizing, by the processing system, the respective household identifier.

6. The method of claim 1, wherein the content embeddings model is configured to output a measure of similarity between television content items and digital content items.

7. The method of claim 1, wherein the content ranking of the second digital content items is indicative of a similarity between the second television content item and each of the second digital content items.

8. A device, comprising:
    a processing system including a processor; and
    a memory that stores executable instructions that, when executed by the processing system, facilitate performance of operations, the operations comprising:
    collecting television viewership information for viewers of first television content items of a television advertising campaign, the viewership information including a household identifier for each household of a plurality of households and a television content identifier for each first television content item viewed by the plurality of households;
    collecting digital viewership information representative of online activity with first digital content items by a plurality of online users, the digital viewership information including a device identifier for each device of the plurality of online users and a digital content identifier for each first digital content item viewed by the plurality of online users;
    identifying second television content items targeted by an advertiser for a television advertising campaign, the second television content items including one or more television programs displayed to viewers;
    recommending second digital content items to be targeted by the advertiser for a digital advertising campaign, wherein the recommending comprises:
    forming content identifier mappings by mapping the first television content items of the television viewership information to the first digital content items identified in the digital viewership information using the household identifiers of the television viewership information and the device identifiers of the digital viewership information;
    training a content embeddings model based upon the content identifier mappings, the content embeddings model encoding a relationship between the first television content items of the television viewership information and the first digital content items of the digital viewership information;

providing, to the content embeddings model, information about the second television content items targeted by the advertiser for the television advertising campaign; and receiving from the content embeddings model a ranked list of targetable second digital content items to be targeted by the advertiser for the digital advertising campaign;

receiving uniform resource locators for a set of web sites as the ranked list of targetable second digital content items; and initiating the digital advertising campaign by including the second digital content items on web sites of the set of websites.

9. The device of claim 8, wherein the providing to the content embeddings model information about the second television content items comprises:
providing to the content embeddings model a television content identifier for each television content item of the second television content items to be targeted by the advertiser for the digital advertising campaign.

10. The device of claim 8, wherein the receiving from the content embeddings model a ranked list of targetable second digital content items comprises:
receiving from the content embeddings model a content ranking of web sites determined by the content embeddings model to be closest to the second television content items targeted by the advertiser for the television advertising campaign.

11. A non-transitory computer-readable storage medium, comprising executable instructions that, when executed by a processing system including a processor, facilitate performance of operations, the operations comprising:
collecting television viewership information for viewers of first targeted television content items of a television advertising campaign of an advertiser, wherein the collecting television viewership information comprises receiving a household identifier and a television content identifier for each first television content item viewed during the television advertising campaign;
collecting digital viewership information for representative of online activity with first digital content items, wherein the collecting digital viewership information includes receiving a web site identifier for a web site and a device identifier of a device of a user that viewed the web site;
forming content identifier mappings by mapping, by the processing system, the first television content items of the television viewership information to the first digital content items identified in the digital viewership information using the household identifiers of the television viewership information and the device identifiers of the digital viewership information;
training a content embeddings model based upon the content identifier mappings, the content embeddings model encoding a relationship between the first television content items of the television viewership information and the first digital content items of the digital viewership information;
providing, to the content embeddings model, television content identifiers of one or more second television content items of the advertising campaign;
receiving from the content embeddings model a ranked list of targetable second digital content items, wherein the ranked list comprises a content ranking of recommended web sites for a digital advertising campaign, the recommend web sites determined by the content embeddings model to be closest to the second television content items targeted by the advertiser for the television advertising campaign; and
initiating the digital advertising campaign by including the one or more second digital content items on one or more of the recommended websites.

12. The non-transitory computer-readable storage medium of claim 11, wherein the operations further comprise collecting impression data, click through data and conversion data for the online activity as digital viewership data.

13. The non-transitory computer-readable storage medium of claim 11, wherein the collecting television viewership information comprises:
receiving an identifier for a household in which a first television content item was viewed during the television advertising campaign; and
anonymizing the identifier for the household.

14. The non-transitory computer-readable medium of claim 11, wherein the operations further comprise:
receiving an opt-in indication from the advertiser; and
responsive to the receiving the opt-in indication, providing to the advertiser the ranked list of recommended websites for the digital advertising campaign to expand an advertising audience of the television advertising campaign to include a digital advertising audience of the digital advertising campaign.

15. The non-transitory computer-readable storage medium of claim 11, wherein the operations further comprise:
expanding targetable digital content of the digital advertising campaign of the advertiser based on targeted television content of the television advertising campaign of the advertiser.

* * * * *